(12) United States Patent
Hertz et al.

(10) Patent No.: US 7,424,085 B2
(45) Date of Patent: Sep. 9, 2008

(54) CLUSTER FOR ADJUSTING A NUCLEAR REACTOR CORE REACTIVITY, ABSORBER ROD OF THE CLUSTER AND METHOD FOR PROTECTING THE ABSORBER ROD AGAINST WEAR

(75) Inventors: Dominique Hertz, Sainte Foy les Lyon (FR); Yves Desprez, Lyons (FR)

(73) Assignee: Framatome Anp, Courbevoie (FR)

( * ) Notice: Subject to any disclaimer, the term of this patent is extended or adjusted under 35 U.S.C. 154(b) by 6 days.

(21) Appl. No.: 10/519,507

(22) PCT Filed: Jun. 6, 2003

(86) PCT No.: PCT/FR03/01710

§ 371 (c)(1),
(2), (4) Date: Aug. 29, 2005

(87) PCT Pub. No.: WO04/001765

PCT Pub. Date: Dec. 31, 2003

(65) Prior Publication Data

US 2006/0034412 A1    Feb. 16, 2006

(30) Foreign Application Priority Data

Jun. 25, 2002   (FR) .................................. 02 07884

(51) Int. Cl.
*G21C 7/00* (2006.01)
(52) U.S. Cl. ........................ 376/339; 376/327; 376/333
(58) Field of Classification Search ................ 376/339, 376/327, 333, 222, 226
See application file for complete search history.

(56) References Cited

U.S. PATENT DOCUMENTS 3,103,479 A * 9/1963 Ransohoff .................. 376/333

(Continued)

FOREIGN PATENT DOCUMENTS

EP           0 353 170           1/1990

(Continued)

OTHER PUBLICATIONS

Patent Abstracts of Japan, vol. 014, No. 098 (P-1011), Feb. 22, 1990, Japan 01 304 392 A (Toshiba Corp), (Dec. 7, 1989).

(Continued)

*Primary Examiner*—Rick Palabrica
(74) *Attorney, Agent, or Firm*—Davidson, Davidson & Kappel

(57) ABSTRACT

A control cluster for a pressurized water nuclear reactor comprising a bundle of neutron-absorbing rods each of which comprises a metal tube called cladding which is sealed off by a top end plug at its top end and by a bottom end plug at its bottom end and has a support, or spider, of radiating shape to which the absorber rods are attached through their upper end plugs, characterized in that the cladding of at least some of the absorber rods is weld-free hafnium tubes, the top end plugs of the absorber rods having hafnium cladding being of titanium-based alloy and being welded to the top end part of the hafnium cladding of the absorber rod, the bottom end plugs being of massive hafnium and being welded to the bottom.

11 Claims, 2 Drawing Sheets

U.S. PATENT DOCUMENTS

| | | | |
|---|---|---|---|
| 3,141,830 A * | 7/1964 | Klepfer et al. | 376/418 |
| 3,467,398 A * | 9/1969 | Bernard | 277/639 |
| 5,742,655 A * | 4/1998 | Hertz et al. | 376/333 |
| 6,614,869 B1 * | 9/2003 | Thibieroz et al. | 376/333 |
| 6,636,580 B2 * | 10/2003 | Murakami et al. | 376/333 |

FOREIGN PATENT DOCUMENTS

| | | |
|---|---|---|
| EP | 0 421 868 | 4/1991 |
| FR | 2 728 097 | 6/1996 |
| WO | 97/48104 | 12/1997 |
| WO | 2004/001765 | 12/2003 |

OTHER PUBLICATIONS

Database WPI, Section Ch, Week 198746, Derwent Publications Ltd., London, GB; AN1987-325716, XP002228833 & JP 62 049950 B (Nippon Genshiryoku Jigyo KK), (Oct. 22, 1987).

* cited by examiner

CLUSTER FOR ADJUSTING A NUCLEAR REACTOR CORE REACTIVITY, ABSORBER ROD OF THE CLUSTER AND METHOD FOR PROTECTING THE ABSORBER ROD AGAINST WEAR

FIELD OF THE INVENTION

The invention relates to a cluster for adjusting the reactivity of a pressurized-light-water-cooled nuclear reactor core and an absorber rod in such an adjusting cluster.

BACKGROUND INFORMATION

Nuclear reactors such as pressurized water reactors comprise a core consisting of fuel assemblies placed adjacent to each other within the reactor vessel. A fuel assembly comprises a bundle of fuel rods held in a supporting structure called a skeleton assembly which comprises the frame for the assembly. This skeleton assembly in particular includes guide tubes located in the axial direction of the fuel assembly connecting the top and bottom ends and supporting the spacer grids for the fuel rods. The purpose of these guide tubes is to ensure that the framework has satisfactory rigidity and to allow the assembly of neutron-absorbing rods used to control the reactivity of the nuclear reactor core to be inserted.

The absorber rods are connected together at their top ends by a support which is generally called a "spider", to form a bundle called a control cluster. The set of absorber rods can move within the guide tubes of the fuel assembly.

In order to regulate the reactivity of the nuclear reactor core while the reactor is in operation the vertical positions of the control clusters within particular assemblies of the core are changed, either so that they are inserted, the control cluster being then moved downwards, or extracted, the control cluster being then moved upwards, so that a variable length of absorber rod is inserted into the core assemblies. Control clusters of different types are generally used in different parts of the nuclear reactor core to control the core's reactivity and the power distribution within the reactor core while the nuclear reactor is in operation. Highly absorbent clusters, black clusters, and less absorbent clusters, grey clusters, are used in particular.

In general the absorber rods comprise a tube closed at its upper end by a first end plug called a top end plug and at its bottom end by a second plug called a bottom end plug for the rod. The absorber rods are secured to the holding spider through their top end plugs.

Generally, in the case of black clusters the rod assembly comprises rods having a high neutron absorption capacity. These absorber rods may comprise a cladding tube enclosing pellets of an absorbent material such as boron carbide $B_4C$, tubes of a neutron-absorbing material which do not enclose absorbent pellets, or again tubes of absorbent material enclosing pellets of boron carbide $B_4C$. In particular it has been suggested that hafnium tubes should be used as tubes of absorbent material for the rods in control clusters. Clusters adjusting the reactivity of nuclear reactors may therefore consist wholly or in part of absorber rods comprising a hafnium tube which may include pellets of an absorbent material such as $B_4C$. In some circumstances it has been suggested that only a part of the absorber rods, for example the bottom part, should be made of hafnium.

Grey clusters include both absorber rods and inert rods consisting of a simple tube of a material which is not absor-bent or has little absorbency, closed by end plugs at its extremities. Absorber rods may comprise tubes of absorbent material such as hafnium.

Hafnium has the advantage over other absorbent materials that it has excellent compatibility with the primary fluid, shows little swelling under irradiation and has good creep resistance at the operating temperature of a pressurized water nuclear reactor. It can therefore be used without any sheathing.

However, hafnium can only be welded to alloys of the same family (titanium, zirconium, hafnium) or alloys forming continuous solid solutions with hafnium.

If hafnium is used for the top end plug, the mechanical strength of the control cluster is not optimal because hafnium does not have sufficiently good mechanical properties for the stresses experienced by the cluster when in operation. Furthermore, the use of a hafnium plug in the top part of an absorber rod is not really justified on the grounds of neutron absorption, given that the top plug is only exposed to a very low neutron flux because it remains above the top of the core. Finally, the use of hafnium for the top end plug is accompanied by an increase in the mass of the cluster, and this may constitute a strong operational constraint. The use of zirconium alloy for the top end plug would be compatible with the mass requirements without any deterioration in absorbency. However, the mechanical properties of these alloys are also inadequate. Conversely, the properties of titanium alloys are perfectly compatible with the performance required.

As far as the bottom end plug is concerned, the use of hafnium is not ruled out for mechanical strength reasons because the properties of this material are compatible with the mechanical stresses applied to that component. In this area where there is a high neutron flux it is useful to have neutron absorption capacity. Finally as the volume of the bottom end plug is small, the resulting increase in mass is small and compatible with the requirements for the mass of control clusters. The bottom end plug may therefore be made of hafnium, or a zirconium alloy, while remaining compatible with functional requirements.

SUMMARY

The objective of the invention is therefore to provide a control cluster for a pressurized water nuclear reactor comprising a bundle of neutron-absorbing rods each of which comprises a metal tube called cladding which is sealed off by a top end plug at its top end and by a bottom end plug at its bottom end and has a support, or spider, of radiating shape to which the absorber rods are attached through their upper end plugs, characterised in that the cladding of at least some of the absorber rods is weld-free hafnium tubes, the top end plugs of the absorber rods having hafnium cladding being of titanium-based alloy and being welded to the top end part of the hafnium cladding of the absorber rod, the bottom end plugs being of massive hafnium and being welded to the bottom end of the hafnium cladding of the absorber rod.

In an example embodiment,
   the top end plugs of absorber rods having hafnium cladding are made of TA6V or TA3V2.5 titanium alloy,
   protection against wear of the rods is provided by a flow of oxidising atmosphere in a travelling arrangement to the cladding welded to the bottom end plug,
   protection against wear of the top end plugs made of titanium alloy is obtained by static furnace treatment in an oxidising atmosphere under conditions ensuring that the properties of the alloy are maintained, the welds for at least one of the top and bottom end plugs are made using one of the following procedures: friction welding, resistance welding, TIG welding, and the hafnium used for manufacture of the cladding and the bottom end plugs contains more than 300 ppm of oxygen.

The invention also relates to an absorber rod of a cluster adjusting a pressurized water nuclear reactor characterised in that it comprises a hafnium tube, a titanium alloy top end plug welded to the top extremity of the hafnium tube and a bottom end plug of massive hafnium welded to the bottom extremity of the hafnium tube.

Finally, the invention also relates to a cluster for adjusting a pressurized water nuclear reactor comprising a bundle of rods and a support of radiating shape, called a spider, to which the absorber rods are attached through their top end plugs, characterised in that the spider is made of titanium-based alloy.

In an example embodiment, at least some of the absorber rods in the cluster comprises a hafnium tube and a top end plug of titanium alloy welded to the top extremity of the hafnium tube.

Hafnium tubes or hollow bars are prepared in accordance with a process by drawing pierced billets on a needle, and then hot drawing on a deformable mandrel, the mandrel being removed in the final operation by cold drawing up to failure. The advantage of this hot shaping process is that it makes it possible to use metal with a very much higher oxygen content than it should have for cold forming operations. It is generally felt that above 300 ppm of oxygen hafnium can no longer be cold rolled. This process makes it possible to use billets containing more than 300 ppm and even more than 700 ppm of oxygen, as obtained after first fusion by electron bombardment in the conventional method of preparation. The oxygen concentration makes it possible to increase the mechanical properties of the metal, which considerably reduces sensitivity to surface and manufacturing defects (marks, out-of-alignment, etc.).

Zirconium or hafnium end plugs are obtained by the machining of solid bars of suitable diameter. This design makes it possible to satisfy the neutron, mechanical and weight requirements.

However, longitudinal and orbital movements of the cluster are likely to give rise to wear in the cluster guides (continuous guides and guide cards) and the fuel assembly (wear on the tip). It is known that these materials (titanium, zirconium and hafnium) do not withstand wear well. One known way of protecting these materials against wear is to provide high temperature oxidation treatment in an oxidising atmosphere. Such treatment produces an oxygen diffusion layer which provides protection against wear and a layer of oxide whose formation is hard to prevent because of the very low equilibrium pressure of the oxide in an oxidising atmosphere. The depth of oxygen diffusion required to ensure wear resistance is some 20 micrometres. The minimum target depth for this operation is therefore 35 to 50 μm.

Implementation of a process for furnace oxidising 3.5 to 4.6 m bars would require a furnace of sufficient size capable of working in an oxidising atmosphere at 800-1000° C.

The invention therefore also relates to the use of oxidising treatment in a travelling arrangement at a higher temperature which ensures oxygen diffusion to a sufficient depth to provide wear resistance, maintaining a constant temperature—a measure of the uniformity of the oxidised bar—without introducing straightness or mechanical inhomogeneities. Diffusion of oxygen over ~50 μm may be obtained by induction heating at 1300-1700° C. in an oxidising atmosphere consisting of argon and oxygen, at a rate of travel of 50-250 mm/min.

Heating to a higher temperature is likely to cause phase changes in the metal (1725-1775° C.) or in the oxide (~1700° C.). Travelling oxidation is carried out on absorber rods which have been welded to their bottom end plugs.

Furthermore, the bottom end plugs of welded tubes are treated to ensure continuity of protection against wear within the area of the bottom end plug of ogival shape. However, the processing of completed rods (with welded top end plugs) is undesirable. In fact in some rods the presence of packing pieces, a column of $B_4C$ pellets and a supporting arrangement disturbs heating, restricts the choice of packing pieces and supporting devices (materials which are likely to give rise to molten eutectics at the processing temperature must be ruled out). In addition to this, the change in heating conditions at the hafnium-titanium junction is difficult to control without risking excessive heating of the titanium, heating which would prejudice persistence of its mechanical properties.

Treatment in a travelling arrangement also makes it possible to avoid oxidising the part which will be welded to the top end plug, thus avoiding contaminating the weld.

The top end plugs of rods are protected against wear by treatment in a static furnace in an oxidising atmosphere under conditions which ensure that the alloy's properties are acquired. Treatment in a static furnace is generally carried out at a temperature of between 550° C. and 850° C., for a period of 2 to 12 hours. For example treatment may be carried out for 4 hours at 730° C.

Finally the invention also relates to a control cluster whose spider is made of titanium-based alloy. This arrangement makes it possible to benefit from the better mechanical properties of these alloys and their lesser density. Thus design of the cluster becomes easier because part of the mass of the spider can be allocated to the absorber rods.

The spider supporting the absorber rods in the cluster may be constructed to be of a shape and dimensions identical to those of the supporting spiders for the absorber rods of control clusters according to the prior art. However, in some circumstances, depending upon the shape and size of the titanium alloy top end plug, the shape and dimensions of the parts of the spider to which the absorber rods are attached can be altered.

Instead of a steel supporting spider for the absorber rods, use of a spider made of titanium-based alloy makes it possible to benefit from mechanical properties of a higher grade than those of steel. The reliability and service life of the spider can therefore be increased as a result of these improved mechanical properties. It is also possible to effect a slight reduction in the transverse dimensions of the spider supporting the control clusters when the spider is made of titanium-based alloy having superior mechanical properties. The loss of head when the control cluster is lowered into the nuclear reactor core and thus reduced, and the lowering time is also reduced.

The spider may be constructed by cutting it out from a piece of titanium alloy whose metallurgical soundness has been checked. The risk of defects is thus reduced and the number of welded or brazed joints between the constituent components of the spider is reduced. Cutting out may be effected by mechanical, chemical or electrical machining, or by water jet cutting.

Titanium alloys as envisaged above are not affected by corrosion within the nuclear reactor vessel. Fewer activatable products are therefore delivered to the primary circuit.

Finally the metallurgical soundness of the material and the simplicity of manufacturing a spider from titanium-based alloy makes it possible to reduce manufacturing costs and operational abnormalities and increase productivity in the manufacture of control clusters.

A spider of titanium-based alloy can be used for any control cluster whether or not it includes rods with hafnium tubes.

Tests have been performed on the mechanical strength of control clusters according to the invention under conditions reproducing the conditions in a functioning nuclear reactor.

Wear tests have also been carried out on the different parts of absorber rods to validate anti-wear treatments using oxidation.

The tests performed were designed to check the wear resistance of the absorber rod end plugs and in particular the top end plugs, the hafnium tubes of the absorber rods and the parts linking the top end plugs with the control cluster spider. Endurance tests were carried out and showed that control clusters according to the invention can operate within a nuclear reactor without premature destruction for the envisaged service lives of nuclear reactors according to the current art.

In order that the invention may be understood a control cluster and an absorber rod according to the invention will be described by way of example with reference to the appended figures.

DETAILED DESCRIPTION

Figure 1:
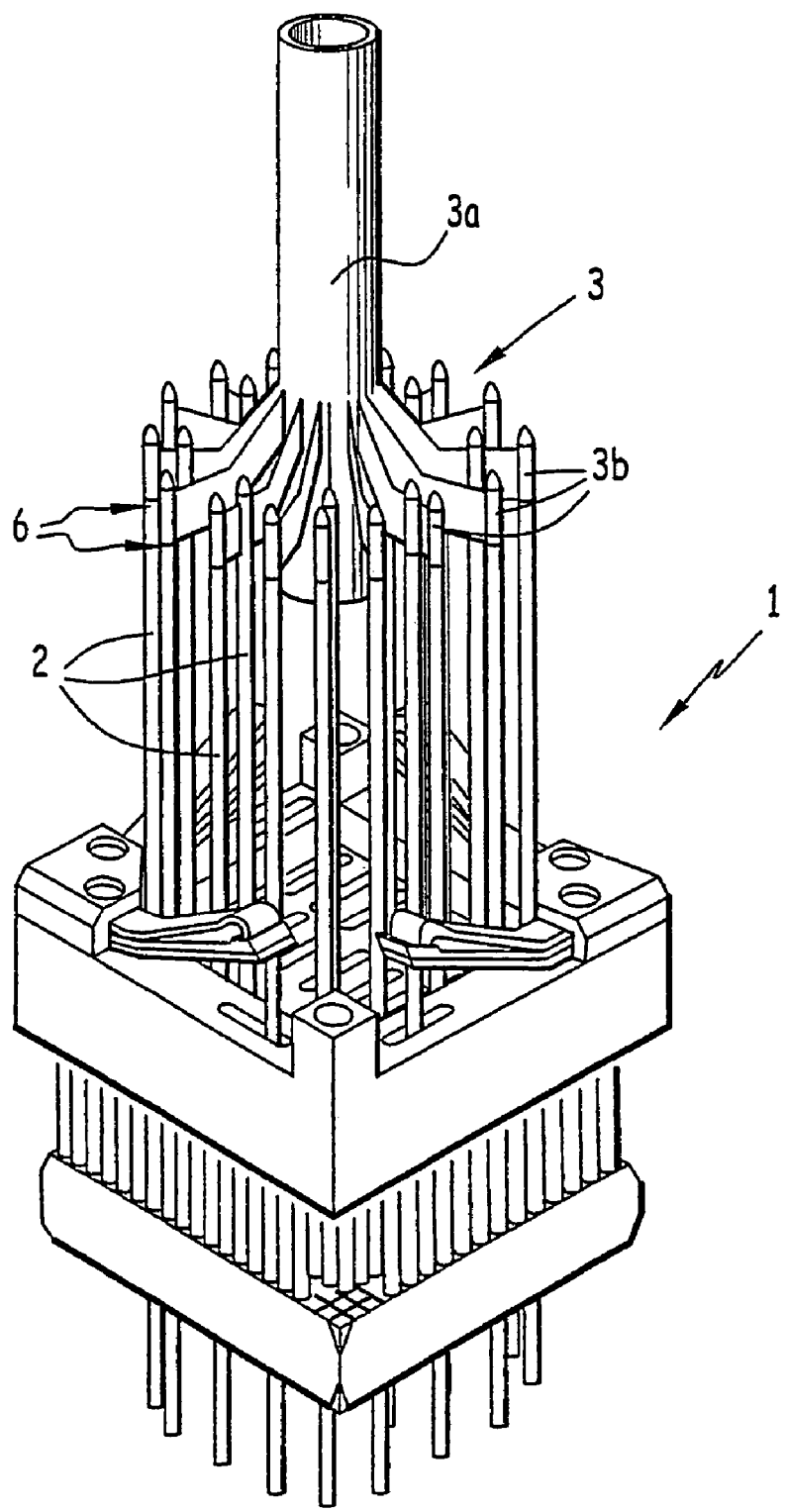
FIG. 1 is a perspective view of a control cluster for a pressurized water nuclear reactor inserted into a fuel assembly.

In FIG. 1 a control cluster for a pressurised water nuclear reactor is indicated in general by the reference number 1.

Control cluster 1 comprises a bundle of absorber rods 2 and a spider 3 supporting and holding rods 2 in the form of a bundle in which the rods are parallel with each other and laterally positioned in the same arrangement as the fuel assembly guide tubes.

Spider 3 comprises a cylindrical hub 3a with internal grooves so that the control cluster can be connected to an absorber rod in order to move it in a vertical direction within the core and arms 3b which are of one piece with hub 3a, to each of which absorber rods 2 are attached by their top end plugs.

Some at least of rods 2 in control cluster 1 comprise a tubular body comprising a hafnium tube.

In the case where cluster 1 is a black cluster, the tubes of all absorber rods 2 in the cluster may be of hafnium.

In the case of a grey cluster, only some of rods 2 comprise a hafnium tube, the tubes of the other rods being of steel or any other non-absorbent material which satisfies operational requirements within a nuclear reactor.

Figure 2:
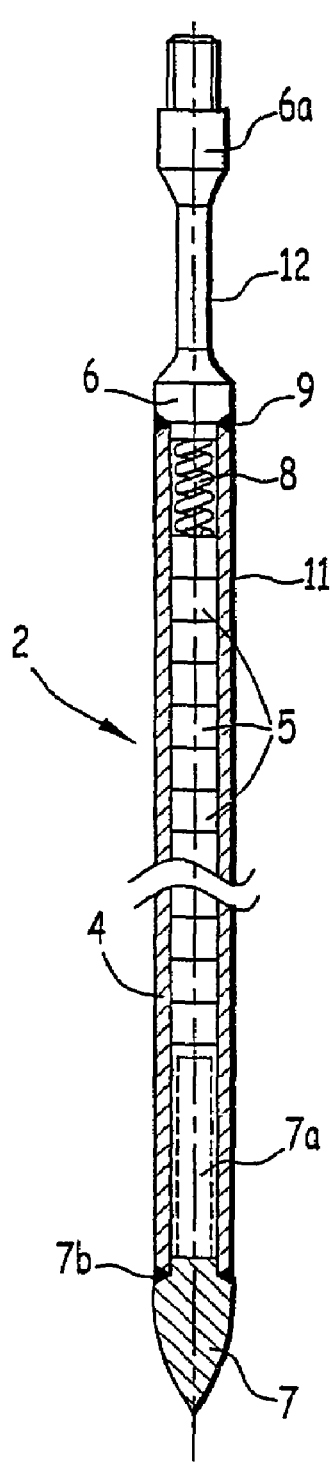
FIG. 2 is a view of an absorber rod according to the invention in axial cross-section.

FIG. 2 shows an absorber rod according to the invention in a black cluster which can be used for example in a pressurized-water-cooled nuclear reactor operating at a power of 1300 MWe.

Rod 2 illustrated in FIG. 2 comprises a hafnium tube 4 enclosing a stack of highly absorbent boron carbide $B_4C$ pellets 5 which is sealed off at its upper extremity by a titanium alloy plug 6 and at its lower extremity by a hafnium or zirconium alloy plug 7 of ogival shape. Oxygen diffusion 11 has been carried out on the tube welded to the bottom end plug and provides protection against wear. The top end plug may or may not be protected by oxygen diffusion 12.

The hafnium used may contain more than 300 ppm of oxygen.

The stack of boron carbide $B_4C$ pellets 5 is held within hafnium tube 4 by a spring or any other immobilising device 8, the bottom end of the column of pellets bearing against bottom end plug 7 through a strut 7a. Bottom end plug 7 of hafnium rod 2 is made of one piece with the bottom end of hafnium tube 4 through a weld bead 7b, welding being carried out for example using a laser beam, a beam of electrons, TIG, friction or resistance welding. The weld obtained is sound and strong.

In accordance with the invention, top end plug 6 of rod 2 is made of titanium or titanium alloy, for example Ti-6Al-4V (TA6V) alloy or TA3V2.5 alloy, and it is rigidly and leak-tightly secured to the top end of tube 4 through a weld 9. Tests have demonstrated that the weld between titanium alloy plug 6 and hafnium tube 4 can be made using for example a laser beam, an electron beam, TIG, friction or resistance welding. The weld obtained is perfectly sound and perfectly strong. In the case of TIG or friction welds, the failure zone of a hafnium/titanium or hafnium/Zircalloy test piece lies outside the welded zone. Failure occurs under a load corresponding to the ultimate strength of the solid material.

Figure 3:
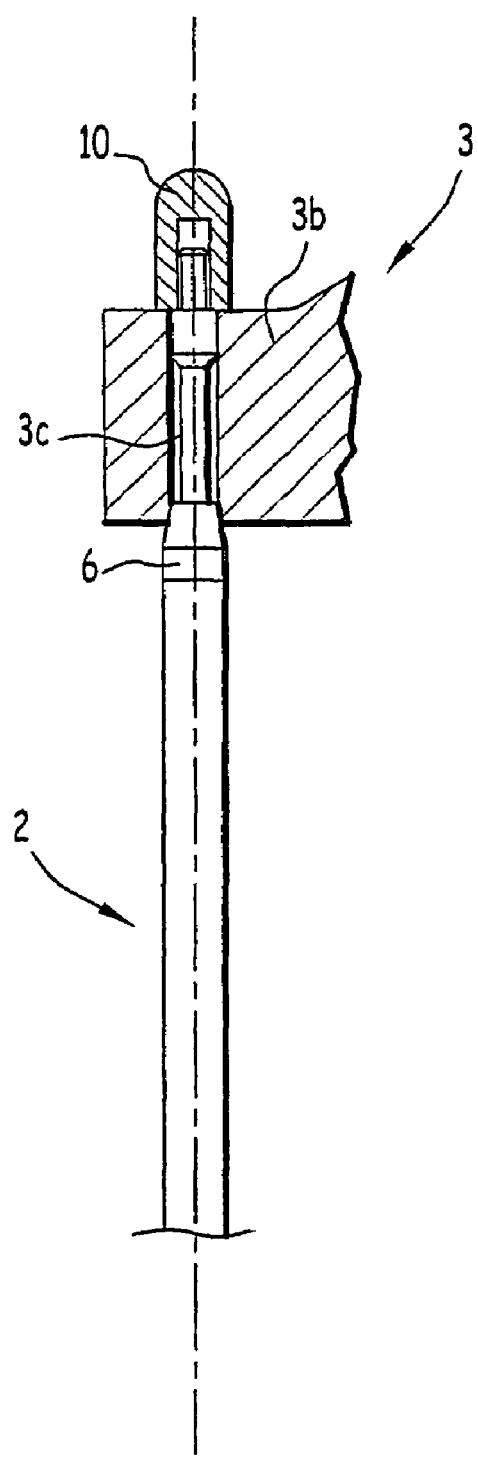
FIG. 3 is a view of the top part of an absorber rod attached to the arm of the spider, in partial cross-section.

As illustrated in FIG. 3, top end plug 6 of titanium alloy which secures absorber rod 2 to an arm 3b of spider 3 of the control cluster may be of a shape and dimensions which are identical to those of a top end plug of an absorber rod according to the prior art. The top end plug 6 which has a thread for securing the absorber rod to arm 3b of spider 3 may be either screwed into the spider arm or placed in a transverse position and held by means of a top nut 10 which also guides the cluster when it is being raised.

As illustrated in FIG. 3, the top end plug of absorber rod 6 has a part of small cross-section 3c which provides the rod with the required flexibility.

Furthermore, it has been established that weld 9 between titanium alloy plug 6 and the top end of hafnium tube 4 (FIG. 2) withstands mechanical, thermal and chemical stresses within a nuclear reactor environment without any additional corrosion being observed at the connecting weld 9 of top end plug 6.

Furthermore, when the control cluster is used in the core of a nuclear reactor, plug 6 lies above the top surface of the core, in a zone which is not subjected to the intense neutron flux obtaining within the nuclear reactor core. The titanium alloy top end plug is therefore not subjected to conditions giving rise to swelling under irradiation or loss of mechanical properties. The top end plug having high grade mechanical properties thus retains its characteristics over long periods of service within the core of a nuclear reactor.

Furthermore, the top end plug of hafnium absorber rods in the control cluster according to the invention which is made of titanium alloy having high grade mechanical properties may be constructed in such a way as to have the greatest possible length compatible with use of the control cluster. The length of the hafnium tube can thus be reduced, making it possible to reduce the cost and adjust the mass of the absorber rods.

The invention applies to any control cluster for a light water cooled nuclear reactor comprising absorber rods comprising a hafnium tube.

What is claimed is:

1. A cluster for adjusting a pressurised water nuclear reactor comprising:
   a bundle of neutron-absorbing rods, each comprising a
      metal tube called cladding which is sealed off at an upper extremity by a top end plug and at a lower extremity by a bottom end plug and a support of radiating shape, to which the absorbing rods are attached through the top end plugs, wherein the cladding of at least one of the absorber rods are weld-free hafnium tubes, the top end plugs of the absorber rods having hafnium cladding are of a titanium-based alloy, the titanium base alloy being welded to the upper extremity of the hafnium cladding of the absorber rod, and the bottom end plugs being of hafnium and welded to the lower extremity of the hafnium cladding of the absorber rod.

2. The cluster for adjustment according to claim 1, wherein the top end plugs of the absorber rods having a hafnium tube are one or TA6V and TA3V2.5 titanium alloy.

3. The cluster for adjustment according to claim 1, further comprising:
    oxidation on the rods, the oxidation protecting against wear of the rods, the oxidation produced at a temperature of 1300° C. to 1700° C. in an oxidising atmosphere, with travel at a rate of 50-250 mm/min over the cladding welded to the bottom end plug.

4. The cluster for adjustment according to claim 1, wherein protection against wear of the top end plugs made of the titanium-based alloy is obtained by treatment in a static furnace in an oxidising atmosphere under conditions ensuring that properties of the titanium alloy persist.

5. The cluster for adjustment according to claim 4, wherein the treatment in a static furnace is performed at a temperature of between 550° C. and 850° C. for a period of between 2 and 12 hours.

6. The cluster for adjustment according to claim 1, wherein at least one of the top end plugs and the bottom end plugs are welded using at least one of friction welding, resistance welding and TIG welding.

7. The cluster for adjustment according to claim 1, wherein the hafnium used to manufacture the cladding and the bottom end plugs contains more than 300 ppm of oxygen.

8. An absorber rod of a cluster for adjustment of a pressurised water nuclear reactor, comprising:
    a cladding of hafnium;
    a top end plug of titanium alloy, the titanium alloy being welded to an upper extremity of the hafnium cladding; and
    a bottom end plug of massive hafnium welded to a lower extremity of the hafnium cladding.

9. A cluster for adjustment of a pressurised water nuclear reactor, comprising:
    a bundle of rods;
    and a support of radiating shape called a spider to which the rods are fixed through top end plugs, wherein the spider is made of titanium-based alloy.

10. The cluster for adjustment according to claim 9, wherein at least one of the absorber rods in the cluster comprise a hafnium tube and a top end plug of titanium alloy welded to a top extremity of the hafnium tube.

11. A cluster for adjusting a pressurised water nuclear reactor comprising:
    a bundle of neutron-absorbing rods, each comprising a metal tube called cladding which is sealed off at an upper extremity by a top end plug and at a lower extremity by a bottom end plug and a spider of radiating shape, to which the absorber rods are attached through the top end plugs, wherein the cladding of some at least of the absorber rods are weld-free hafnium tubes, the top end plugs of the absorber rods having hafnium cladding are of a titanium-based alloy, the titanium-based alloy being welded to the upper extremity of the hafnium cladding of the absorber rod, and the bottom end plugs being of massive hafnium and welded to the lower extremity of the hafnium cladding of the absorber rod.

* * * * *